(12) United States Patent
Yamaguchi et al.

(10) Patent No.: US 6,744,779 B1
(45) Date of Patent: Jun. 1, 2004

(54) DATA PROCESSING SYSTEM (75) Inventors: Masashi Yamaguchi, Osaka (JP);
Takahiro Yamada, Yokohama (JP);
Tomonori Kumagai, Kawasaki (JP);
Seiya Yamazaki, Kawasaki (JP);
Takeshi Yonekura, Kawasaki (JP)

(73) Assignees: Matsushita Electric Industrial Co., Ltd., Osaka-fu (JP); Fujitsu Limited, Kanagawa (JP)

( * ) Notice: Subject to any disclaimer, the term of this patent is extended or adjusted under 35 U.S.C. 154(b) by 0 days.

(21) Appl. No.: 09/412,616

(22) Filed: Oct. 6, 1999

(30) Foreign Application Priority Data

Oct. 7, 1998 (JP) .......................... 10-284906
Oct. 4, 1999 (JP) .......................... 11-282569

(51) Int. Cl.$^7$ .......................... H04L 12/403

(52) U.S. Cl. .......................... 370/449; 370/217; 370/221; 370/225

(58) Field of Search .......................... 710/103; 370/217, 370/219, 220, 221, 222, 223, 224, 225, 227, 228, 447, 451, 449, 452, 460, 461, 462, 463

(56) References Cited

U.S. PATENT DOCUMENTS

| | | | | |
|---|---|---|---|---|
| 4,414,624 A | * | 11/1983 | Summer et al. | 712/21 |
| 5,572,685 A | | 11/1996 | Fisher et al. | |
| 5,758,101 A | | 5/1998 | Pemberton | |
| 5,777,996 A | | 7/1998 | Chan et al. | |
| 5,920,266 A | * | 7/1999 | Allgood et al. | 710/300 |
| 6,408,343 B1 | * | 6/2002 | Erickson et al. | 710/15 |

OTHER PUBLICATIONS

"Wireless Base Station Device for Digital Mobile Telephone/Cellular Phone System", Fujitsu, 45.2, pp. 112–116.

* cited by examiner

Primary Examiner—Alpus H. Hsu
Assistant Examiner—Thien D Tran
(74) Attorney, Agent, or Firm—Wenderoth, Lind & Ponack, L.L.P.

(57) ABSTRACT

The data processing system includes I/O units for transmitting and receiving data, control units for processing the data, and a common bus unit including a common bus. Function cards in each unit are daisy-chained to I/O buses having characteristics to support hot-swapping, and both ends of the I/O buses are terminated with resistors respectively. The units are daisy-chained to the common bus, and both ends of the common bus are terminated with resistors respectively. Drivers/receivers drive each bus to transmit and receive data between the common bus and the I/O buses.

1 Claim, 10 Drawing Sheets

DATA PROCESSING SYSTEM

BACKGROUND OF THE INVENTION

1. Field of the Invention

The present invention relates to a data processing system including a plurality of units connected to a bus, and is applied, for example, to a communication control data processing system for a base station system in mobile communications such as cellular phones.

2. Description of the Background Art

In recent years, with the rapid increase of mobile communication terminals such as cellular phones, the importance of a communication control data processing system for processing a large amount of information including the start and end of a call, position registration, and monitoring of radio quality, has increased.

A conventional communication control data processing system for a base station system in mobile communications is disclosed, for example, in "Wireless Base Station System for Digital Mobile Telephone/Cellular Phone System", FUJITSU, 45.2, pp. 112–116.

Figure 10:
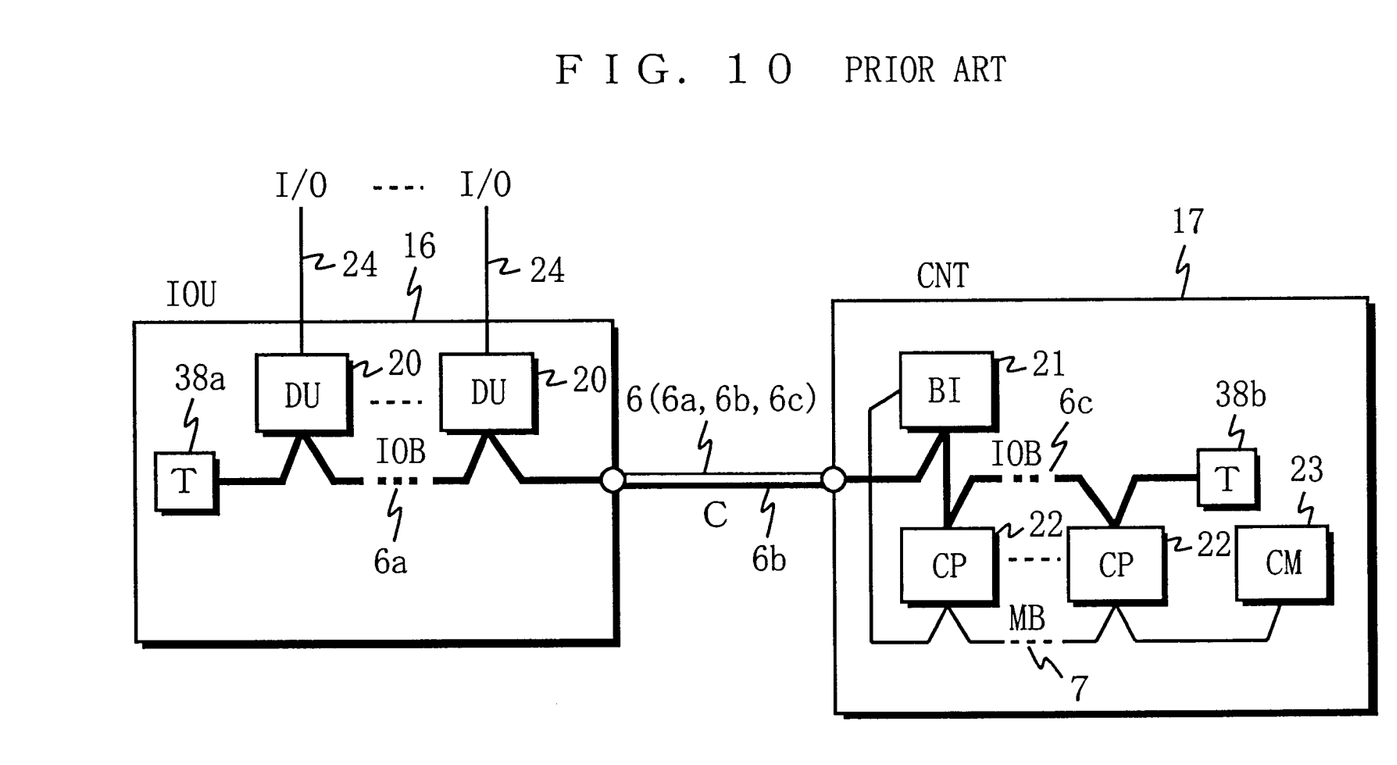
FIG. 10 is a block diagram showing the structure of a conventional communication control data processing system.

FIG. 10 is a block diagram showing the structure of the conventional communication control data processing system. The communication control data processing system includes an I/O unit 16 and a control unit 17. Each unit has a plurality of function cards according to the type of unit. The I/O unit 16 includes I/O cards 20, while the control unit 17 includes a bus interface card 21, a plurality of processor cards 22, and a shared memory card 23. As shown in FIG. 10, the function cards are connected to an I/O bus 6 extending over the units and to a main bus 7 in the control unit 17. The I/O bus 6 is structured of internal wiring 6a in the I/O unit 16, internal wiring 6c in the control unit 17, and a cable 6b connecting both units.

The communication control data processing system transmits and receives communication control data through I/O lines 24 to and from other systems (not shown) such as a base station system in mobile communications, and processes the received communication control data in parallel using the processor cards 22. The bus interface card 21 controls the transmission of communication control data between the I/O unit 16 and the control unit 17. The shared memory card 23 stores a control table including various information on communications.

Since a high degree of reliability is required for communication control data processing systems, the I/O bus 6 and the main bus 7 have the following characteristics. First, both buses support hot-swapping. These buses and the function cards which can be hot-swapped allow hot-swapping of a function card for active maintenance during the operation of the data processing system. Second, the function cards are daisy-chained to the buses, and both ends of each bus are terminated with terminators. With these buses, waveform distortion of transmission signals due to reflection can be corrected thereby allowing reliable data transmission between the function cards. For example, in the data processing system shown in FIG. 10, the function cards are daisy-chained to the I/O bus 6, and one end of the I/O bus 6 is terminated with a resistor 38a while the other is with a resistor 38b. Similarly, the function cards are daisy-chained to the main bus 7 with both ends terminated with resistors (not shown). Daisy chain connections include not only a connection between a single driver and a multi-receiver but also include a bi-directional multi-point connection. In a daisy chain, a stub length, which is an allowable length of a branch line, is predetermined according to transmission characteristics. A connection whereby the function cards are connected in one stroke to internal wiring in a unit is one form of the daisy chain connections when the stub length is 0. Further, the daisy-chained function cards do not have any priority.

However, with the recent rapid increase in the number of terminals for mobile communications, base station systems in mobile communications for the next generation are required to deal with a number of terminals to the tune of over ten times the existing ones. Furthermore, in the base station systems for the next generation, and as performance is improved, more reliable communication control data processing systems without service interruptions are required.

In the conventional communication control data processing system, each function card has its auxiliary function card. When a fault occurs in a function card, the faulty function card is isolated, and an operation continues with its auxiliary function card, which thereby reduces downtime. However, a fault which constrains bus data transmission may occur due to a fault having occurred in the function card. With such a fault which cannot be overcome by switching a faulty function card to its auxiliary card, the conventional communication control data processing system takes a long time for recovery, which thereby causes service interruption.

To solve the above problems, each type of unit has its auxiliary unit. When a fault which cannot be overcome by switching to an auxiliary function card occurs in a unit, the faulty unit is isolated, and an operation continues with its auxiliary unit. However, in the data processing system as shown in FIG. 10, the internal wiring 6a and 6c is used as part of the I/O bus 6. Therefore, to isolate the faulty unit, the I/O bus has to be temporarily disconnected so as to interrupt services.

Further, a method can be devised in which a plurality of units are daisy-chained with a cable having both ends terminated with terminators through the adoption of a SCSI (Small Computer System Interface), which is a peripheral interface for small computers. In this method, however, there are at most two SCSI drives included in each unit. Moreover, the internal cable length for connecting the SCSI drives in each unit is restricted to the stub length, which is the branch line length predetermined according to the transmission characteristics. Therefore, this method cannot be applied to data processing systems having a plurality of function cards in each unit.

SUMMARY OF THE INVENTION

Therefore, an object of the present invention is to provide a data processing system in which a plurality of units are daisy-chained with both ends terminated with terminators, which allows quick hot-swapping of a faulty unit without bus reconnection.

The present invention has the following features to solve the problems described above.

A first aspect of the present invention is directed to a data processing system in a unit structure comprising:
  a plurality of units having one or more function elements, an individual bus for connecting the function elements;
  a common bus which daisy-chains each of the units with both ends terminated with terminators and which supports hot-swapping; and bus relay means for relaying data between the common bus and the individual bus.

In the first aspect, the common bus and each individual bus are independent. Therefore, when a fault occurs in a unit during operation, the bus structure and data transmission other than those concerned with the bus in the faulty unit are not affected, thereby allowing quick hot-swapping of the faulty unit for active maintenance during operation without bus reconnection.

According to a second aspect, in accordance the first aspect, the individual bus daisy-chains the function elements in each of the units with both ends terminated with terminators, and further, the individual bus supports hot-swapping.

In the second aspect, the individual bus which supports hot-swapping daisy-chains the function elements with both ends terminated with terminators, thereby allowing quick hot-swapping of a faulty function element for active maintenance without the need for bus reconnection.

According to a third aspect, in accordance with the first aspect, the bus relay means includes:

first bus receivers for receiving data from the individual bus;

first bus drivers for transmitting the data received by the first bus receivers to the common bus;

second bus receivers for receiving the data from the common bus; and second bus drivers for transmitting the data received by the second bus receivers to the individual bus.

In the third aspect, through the use of the bus drivers and the bus receivers, both of which support hot-swapping, the bus relay means, which supports hot-swapping of the units without causing noise, can be easily constructed with smaller circuitry.

According to a fourth aspect, in accordance with the third aspect, one of the plurality of units includes a bus arbitrating part for polling each of the function elements, wherein during the polling by the bus arbitrating part for signals required for the polling in the common bus, the bus relay means drives only the first bus drivers corresponding to the unit which includes the bus arbitrating part; and wherein during responding to the polling by the bus arbitrating part for signals required for the polling response in the common bus, the bus relay means drives only the first bus drivers corresponding to the unit including the function element which responds to the polling.

In the fourth aspect, the bus relay means is controlled according to the polling by the bus arbitrating part, thereby preventing signals included in the common bus from being simultaneously driven by the plurality of drivers. Further, the units other than the unit which performs bus transmission via the common bus do not become involved in data transmission, which allows the maintenance of the units to be hot-swapped without causing data transmission via the common bus to stop.

According to a fifth aspect, in accordance with the first aspect, the common bus has an interface of a balanced transmission line.

According to a sixth aspect, in accordance with the second aspect, the individual bus has an interface of a balanced transmission line.

In the fifth and sixth aspects, an interface of the balanced transmission line is used for the common bus or the individual bus to improve reliability of bus data transmission, thereby obtaining a reliable data processing system.

According to a seventh aspect, in accordance with the first aspect, a common bus unit including the common bus and the bus relay means is implemented outside the units.

In the seventh aspect, the data processing system is constructed by making a one-to-one connection between the common bus unit and each unit, which thereby allows easy cable connection.

According to an eighth aspect, in accordance with the first aspect, the bus relay means is implemented in each of the units.

In the eighth aspect, the data processing system is constructed by connecting the units with one cable, thereby allowing easy implementation.

According to a ninth aspect, in accordance with the first aspect, one or more of the units are I/O units, each of which includes plurality of I/O cards, wherein the units that are I/O units are transmit and receive communication control data through an I/O line, and another one or more of the units are control units, each of which includes a plurality of processor cards and a shared memory card, wherein the units that are control units process the communication control data with the plurality of processor cards with reference to information stored in the shared memory card.

In the ninth aspect, with the I/O unit for transmitting and receiving communication control data and the control unit for processing the communication control data, the data processing system allows quick hot-swapping of a faulty unit for active maintenance during operation without the need for bus reconnection.

A tenth aspect of the present invention is directed to a data processing system with a unit structure comprising:

a plurality of units having one or more function elements, an individual bus for daisy-chaining the function elements and supporting hot-swapping;

a unit connection bus which connects the units in a loop to form a loop-shaped bus with the individual bus and which supports hot-swapping;

switch control means for outputting a control signal based on states of the units; and switch means for disconnecting the loop-shaped bus at least at one point and terminating both ends of the disconnected loop-shaped bus with terminators.

In the tenth aspect, the function elements in each unit are daisy-chained to the line-shaped bus obtained by disconnecting the loop-shaped bus with both ends of the line-shaped bus that is terminated with the terminators. Therefore, the data processing system allows quick hot-swapping of a faulty unit for active maintenance during operation without the need for bus reconnection.

According to an eleventh aspect, in accordance with the tenth aspect, the unit connection bus has an interface of a balanced transmission line.

In the eleventh aspects, an interface of the balanced transmission line is used for the unit connection bus to improve the reliability of bus data transmission, thereby obtaining a reliable data processing system.

According to a twelfth aspect, in accordance with the tenth aspect, one or more of the units are I/O units, each of which includes a plurality of I/O cards, wherein the units that are I/O units transmit and receive communication control data through an I/O line, and another one or more of the units are control units, each of which includes a plurality of processor cards and a shared memory card, wherein the units that are control units process the communication control data with the plurality of processor cards with reference to information stored in the shared memory card.

In the twelfth aspect, with the I/O unit for transmitting and receiving communication control data and the control unit for processing the communication control data, the data processing system allows quick hot-swapping of a faulty unit for active maintenance during operation without the need for bus reconnection.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

A communication control data processing system according to a first embodiment of the present invention is described referring to FIGS. 1 to 4. The communication control data processing system (hereinafter referred to as a data processing system) according to the first embodiment connects a plurality of units to each other using a common bus unit, which thereby allows hot-swapping by the unit.

Figure 1:
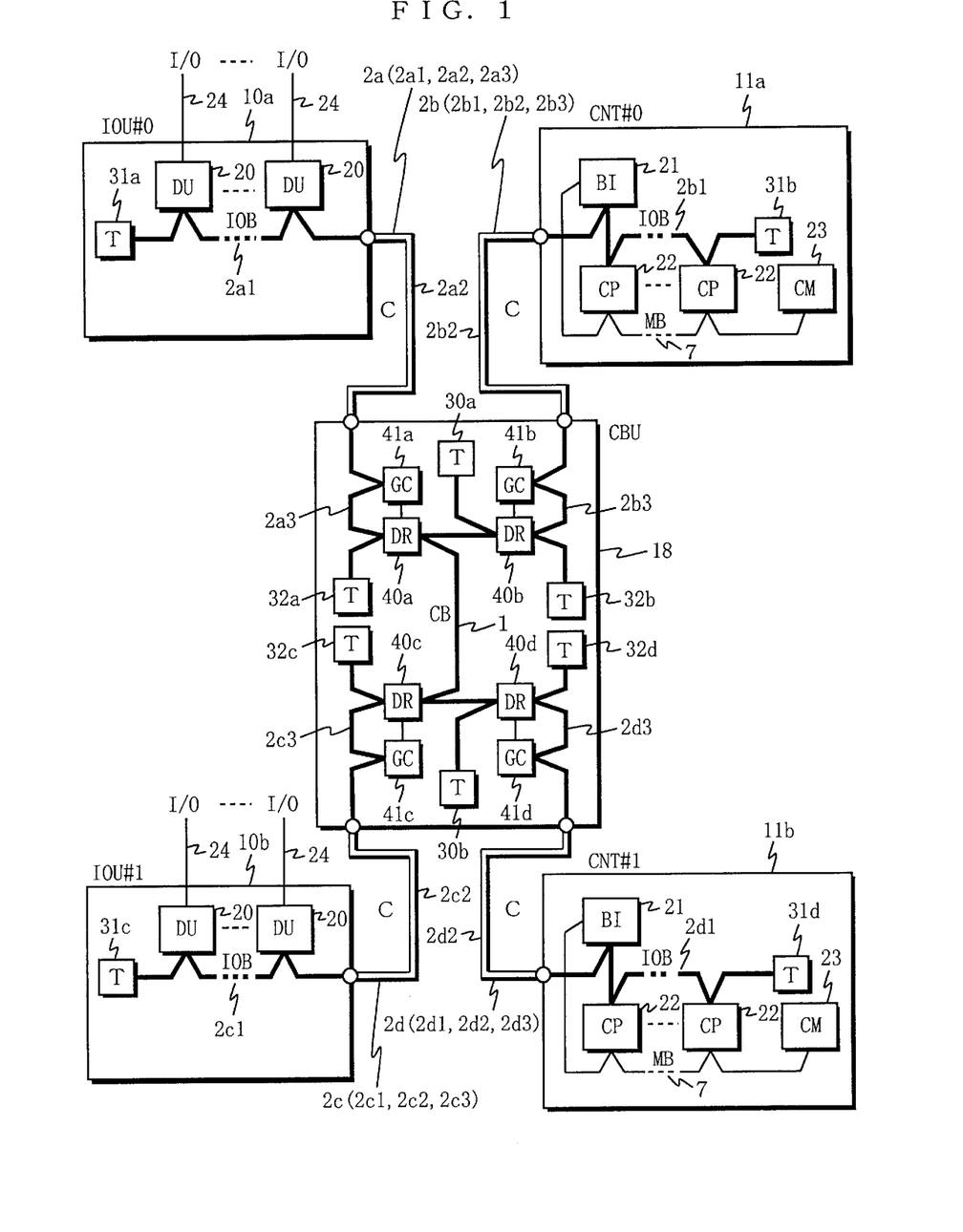
FIG. 1 is a block diagram showing the structure of a communication control data processing system according to a first embodiment of the present invention.

FIG. 1 is a block diagram showing the data processing system according to the first embodiment of the present invention. The data processing system includes dual-redundant I/O units 10a and 10b, dual-redundant control units 11a and 11b, and a common bus unit 18. The I/O unit 10b and the control unit 11b are auxiliary units to improve fault tolerance, having the same structure as the I/O unit 10a and the control unit 11a, respectively.

Each unit has a plurality of function cards which can be hot-swapped, according to the type of unit. The I/O unit 10a includes I/O cards 20 for communication using I/O lines 24. Through the I/O lines 24, the I/O unit 10a transmits and receives communication control data such as the start and end of a call, position registration, quality control to and from external communication systems (not shown) such as a base station in mobile communications.

The control unit 11a includes a bus interface card 21, processor cards 22, and a shared memory card 23. These function cards are connected to a main bus 7. The bus interface card 21 controls communication control data transmission between the I/O unit 10a and the control unit 11a. The shared memory card 23 stores a control table including various information on communications. Referring to the control table stored in the shared memory card 23, the processor cards 22 process the communication control data inputted from the I/O unit 10a, and then outputs the results to the I/O unit 10a.

To improve fault tolerance and minimize downtime, the function cards in the unit are doubled. Each function card in the unit has its own auxiliary card. The I/O cards 20 in the I/O unit 10a are doubled, although not shown in FIG. 1 for the purpose of simplification of the drawing. The bus interface card 21 and the shared memory card 23 in the control unit 11a are doubled, while the processor cards 22 are (N+1) multiplexed although not shown in FIG. 1 for the purpose of simplification of the drawing.

The I/O units 10a and 10b and the control units 11a and 11b are connected through the common bus unit (common bus device) 18 by cables 2a2, 2b2, 2c2, and 2d2. The function cards in each unit are connected to I/O buses 2a to 2d, transmitting and receiving communication control data using the common bus 1 and the I/O buses 2a to 2d.

The data processing system of the present invention processes communication control data in parallel using the plurality of processor cards 22. With the I/O unit 10a and the control unit 11a being operated and with the other units being standby, the data processing system processes communication control data as follows. The I/O unit 10a in operation receives communication control data from the external communication systems (not shown) through the I/O line 24. In operation, the received communication control data is transmitted through the I/O bus 2a, the common bus 1, and the I/O bus 2b to the control unit 11a. The processor card 22 included in the control unit 11a in operation processes the received communication control data by referring to the control table stored in the shared memory card 23. The process results are transmitted through the I/O bus 2b, the common bus 1, and the I/O bus 2a to the I/O unit 10 in operation. The I/O unit 10 in operation transmits the process results to the external communication systems (not shown) through the I/O lines 24.

Described below are the buses of the data processing system according to the first embodiment. The I/O bus 2a is constructed of internal wiring 2a1 in the I/O unit 10a, internal wiring 2a3 in the common bus unit 18, and a cable 2a2 connecting the I/O unit 10a and the common bus unit 18. The I/O cards 20 in the I/O unit 10a are daisy-chained to the I/O bus 2a. One end of the I/O bus 2a is placed in the I/O unit 10a and terminated with a resistor 31a, while the other end is placed in the common bus unit 18 and terminated with a resistor 32a. The other I/O buses 2b to 2d are also constructed in the same manner as the I/O bus 2a. The function cards in each unit are daisy-chained to the main bus 7 with both ends terminated with resistors (not shown).

The common bus unit 18 includes a common bus 1 independent of the I/O buses 2a to 2d. All units are daisy-chained to the common bus 1, and one end of the common bus 1 is terminated with a resistor 30a while the other end is terminated with a resistor 30b. The common bus unit 18 includes drivers/receivers 40a to 40d and gate controllers 41a to 41d to connect the common bus 1 and the I/O buses 2a to 2d.

For the common bus 1 and the I/O buses 2a to 2d, a bus such as RS485, for example, having characteristics to support hot-swapping is used. RS485 is an interface of a balanced (differential) transmission line defined by the Electronic Industries Association (EIA) standards.

In the above described data processing system, the I/O bus 2a to 2d are structured independently of the common bus 1. Therefore, isolating a faulty unit does not affect the bus structure and data transmission other than those buses concerned with the I/O bus in the faulty unit, thereby allowing hot-swapping of the unit for active maintenance during the operation of the data processing system.

Furthermore, the function cards are daisy-chained to the I/O buses 2a to 2d having characteristics to support hot-swapping, and one end of the I/O buses 2a to 2d is terminated with the resistors 31a to 31d, while the other is with the resistors 32a to 32d, respectively. This allows reliable data transmission between the function cards and active maintenance of a faulty function card during the operation of the data processing system. Moreover, the units are daisy-chained to the common bus 1, and one end of the common bus 1 is terminated with the resistor 30a, while the other is with the resistor 30b. Therefore, reliable data transmission can be achieved between the function cards over the units.

Figure 2:
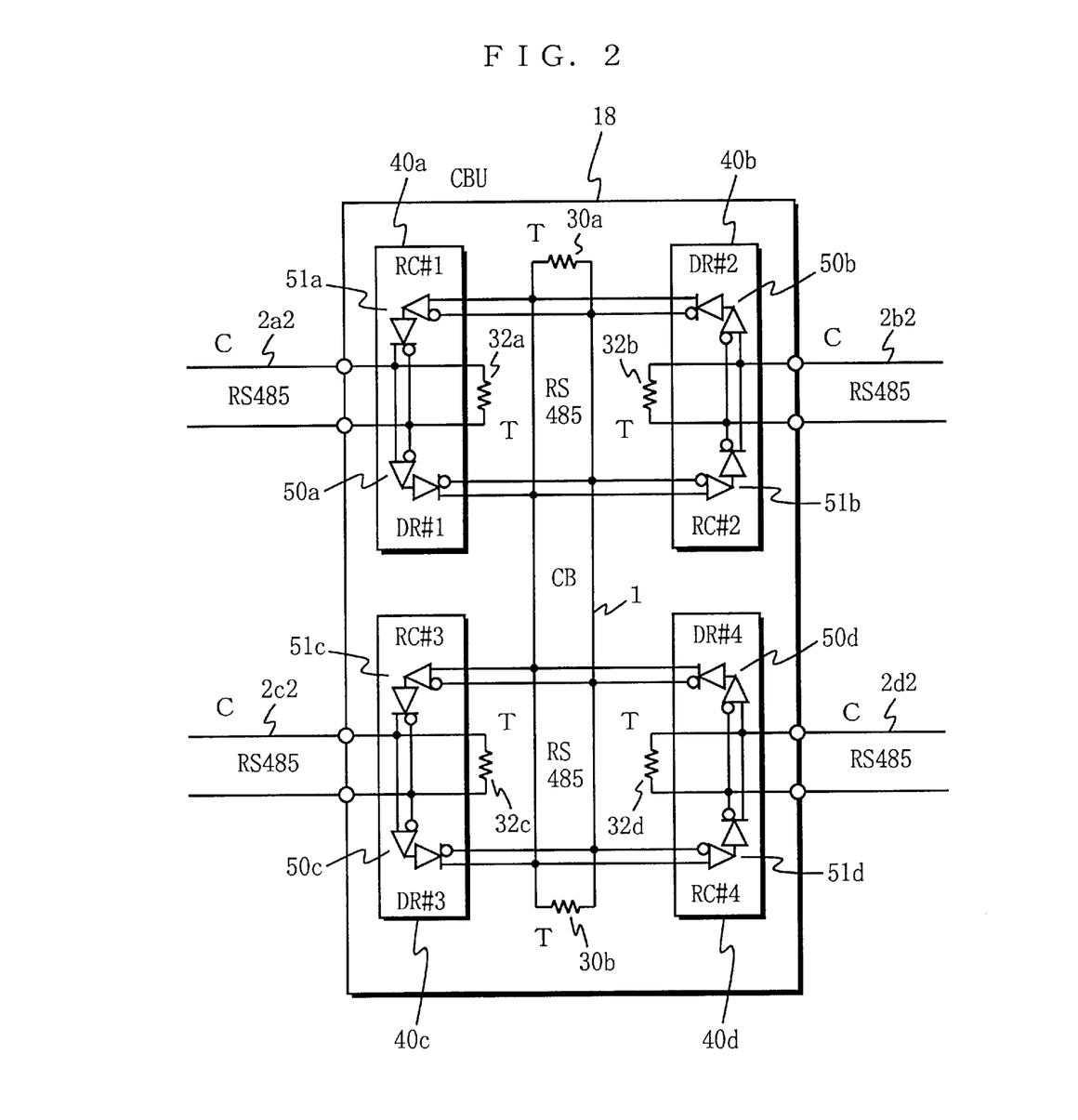
FIG. 2 is a diagram showing a common bus interface of the communication control data processing system according to the first embodiment of the present invention.

FIG. 2 is a detailed diagram showing an interface of one signal via the common bus 1 of the data processing system according to the first embodiment. Note that interfaces of other signals via the common bus are the same as the interface in FIG. 2. As shown in FIG. 2, the driver/receiver 40a includes a common bus driver 50a and a common bus receiver 51a. The common bus driver 50a receives data from the I/O bus 2a, and drives the common bus 1 to transmit the data thereto. The common bus receiver 51a receives the data from the common bus 1, and drives the I/O bus 2a to transmit the data thereto. The other drivers/receivers 40b to 40d have the same structure as the driver/receiver 40a. For the common bus drivers 50a to 50d and the common bus receivers 51a to 50d, a device such as SN75176 manufactured by Texas Instruments Incorporated can be used. The resistors 30a, 30b, 31a to 31d, and 32a to 32d each have a resistance of 100 ohms, for example.

Figure 3:
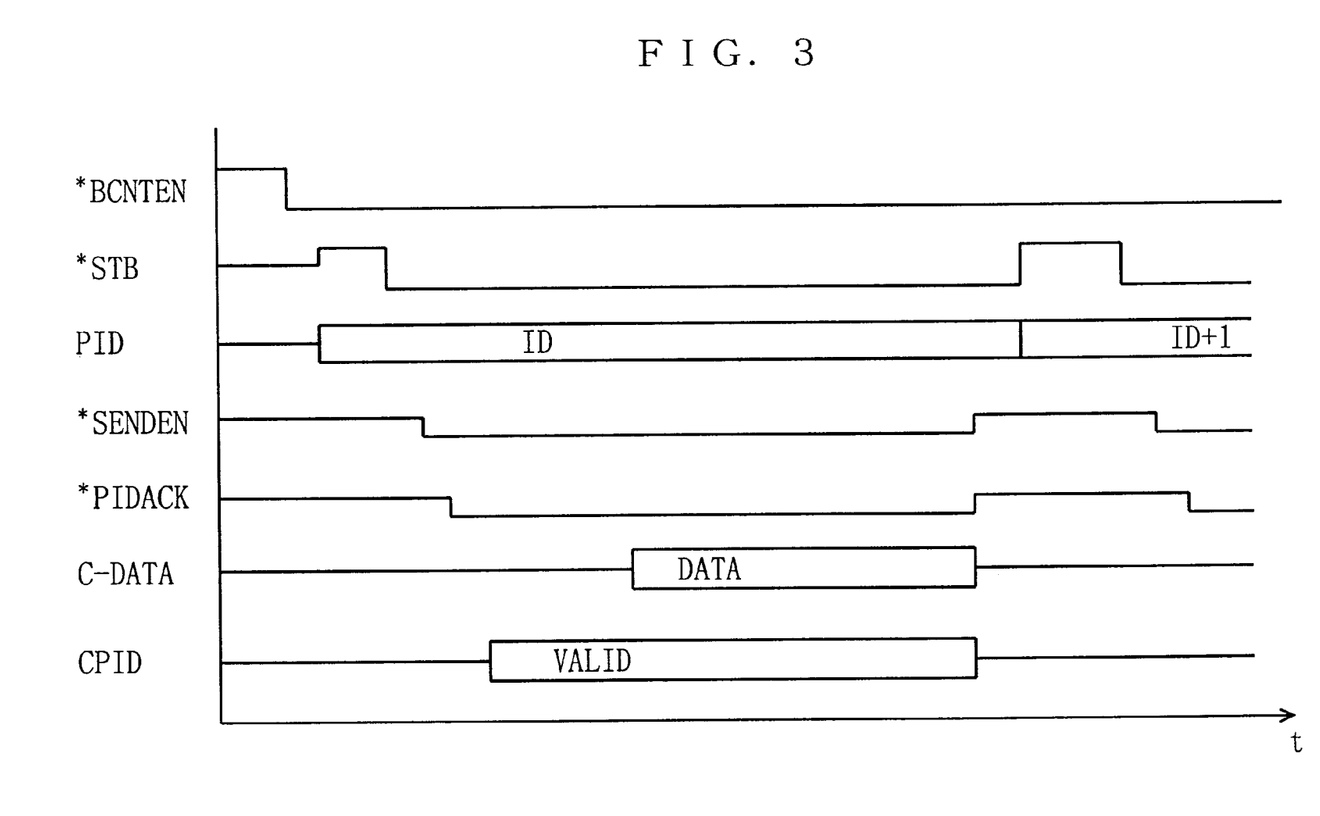
FIG. 3 is a diagram showing timing charts in a common bus of the communication control data processing system according to the first embodiment of the present invention.

FIG. 3 is a diagram showing timing charts in the common bus 1 of the data processing system according to the first embodiment. Here, signals with an asterisk (*) denote negative logical signals. In FIG. 3, signals represented by *BCNTEN, *STB, and PID are output from the bus interface card 21 in the control unit 11 a in operation. Signals represented by * SENDEN, *PIDACK, C-DATA, and CPID are output from the I/O card 20 or the processor cards 22 for data transmission.

The I/O cards 20 and the processor cards 22 transmit and receive communication control data according to the polling by the bus interface card 21. The bus interface card 21 sequentially sends to PID a function card number provided for the function card which enables data transmission, and also drives *STB LOW, thereby notifying each function card that PID is active. The function card with transmission data outputs *PIDACK when its function card number matches PID, and sends the function card number of destination to CPID and the data to C-DATA. Each function card fetches C-DATA when its own card number matches CPID.

In bus data transmission, the gate controllers 41a to 41d control the drivers/receivers 40a to 40d based on *BCNTEN and *SENDEN as follows. During the polling by the bus interface card 21, the gate controller 41a to 41d monitor each *BCNTEN in the I/O buses 2a to 2d. On detecting that *BCNTEN is LOW, the gate controller 41b enables the common bus driver 50b for *STB and PID, driving the common bus 1. The gate controller 41a enables the common bus receiver 51a for these signals, driving the I/O bus 2a. The gate controllers 41c and 41d operate in the same manner as the gate controller 41a. *STB and PID are thus sent from the bus interface card 21 in the control unit 11a in operation to all of the other units.

On the other hand, during response to the polling, the gate controllers 41a to 41d monitor each *SENDEN in the I/O buses 2a to 2d. When the I/O card 20 in the I/O unit 10a responds to the polling, the gate controller 41, on detecting that *SENDEN is LOW, enables the common bus driver 50a for *PIDACK, C-DATA, and CPID, thereby driving the common bus 1. The gate controller 41b enables the common bus receiver 51b for these signals, driving the I/O bus 2b. The gate controllers 41c and 41d operate in the same manner as the gate controller 41b. *PIDACK, C-DATA and CPID are thus sent from the I/O card 20 in the I/O unit 10a in operation to all of the other units.

Figure 4:
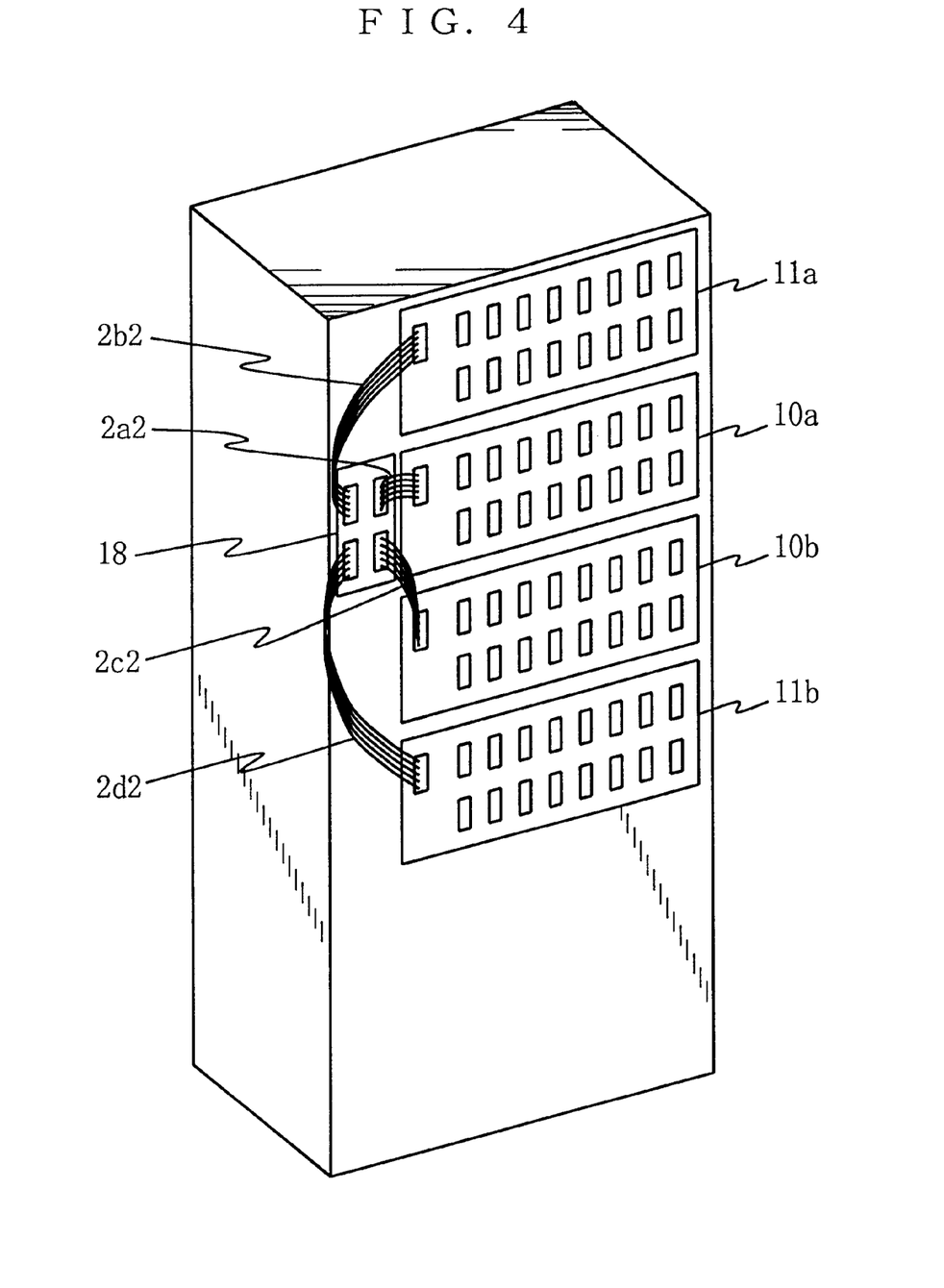
FIG. 4 is an exemplary cable connection between units on the back of the communication control data processing system according to the first embodiment of the present invention.

FIG. 4 is an exemplary cable connection between the units on the back of the data processing system according to the first embodiment of the present invention. The data processing system shown in FIG. 4 includes the dual-redundant I/O units 10a and 10b, the dual-redundant control units 11a and 11b, and the common bus unit 18. These units are connected to each other through the cables 2a2, 2b2, 2c2, and 2d2. RS485 is used for the common bus in the common bus unit 18 and the I/O bus in each unit.

Since RS485 is used for the I/O bus, the cable connecting each unit and the common bus unit can be extended up to a distance defined by RS485. This extension increases flexibility in position where each unit is implemented on a shelf. Further, through the use of RS485 for the I/O bus with both ends terminated with the resistors, reliable data transmission can be achieved using such I/O buses. Furthermore, each cable makes a one-to-one connection between each unit and the common bus unit 18, thereby allowing easy cable connection.

As described above, the data processing system according to the first embodiment comprises a plurality of units including a plurality of function cards and a common bus unit. Furthermore, the function cards in each unit are daisy-chained to an I/O bus, which is an individual bus, with both ends terminated with resistors. In the above structured data processing system, the individual bus is independently structured of the common bus, thereby allowing quick hot-swapping of a faulty unit for active maintenance without the need for bus reconnection.

Specifically, the data processing system comprises an I/O unit including an I/O card for transmitting and receiving communication control data through an I/O line, and a control unit for processing the communication control data by referring to information stored in a shared memory card. This structure allows quick hot-swapping of a faulty unit for active maintenance without the need for bus reconnection.

Furthermore, drivers/receivers are provided as bus relay means in the common bus unit to connect each individual bus and the common bus. The drivers/receivers are controlled based on the polling for the function cards. It is thus possible to connect each individual bus and the common bus with smaller circuitry. Through the use of the bus drivers and the bus receivers which both support hot-swapping, the bus relay means, which supports hot-swapping of the units without causing noise, can be easily constructed with smaller circuitry. The units other than the unit which performs bus transmission via the common bus do not become involved in data transmission, thereby allowing the maintenance of the units to be hot-swapped without causing data transmission via the common bus to stop.

Still further, an interface of a balanced (differential) transmission line is used for the individual bus or the common bus, thereby allowing reliable data transmission between the function cards. Specifically, when RS485, which is an exemplary interface of the balanced transmission line, is used for the I/O bus, the cable between the units can be extended up to a predetermined distance, thereby allowing more flexibility in position where the units are implemented and providing an easy cable connection.

In this first embodiment, RS485 is used for the common bus and the individual buses. Alternatively, the common bus and the individual buses may be made based on different specifications. Further, the individual buses may be different from each other in specification. For example, the I/O bus in the I/O unit and the I/O bus in the control unit may be different in specification. In the first embodiment, the common bus driver and the common bus receiver are constructed using an element integrating a bus driver and a bus receiver. Alternatively, the bus driver and the bus receiver are separate elements, which are used to construct the common bus driver and the common bus receiver.

Second Embodiment

Figure 5:
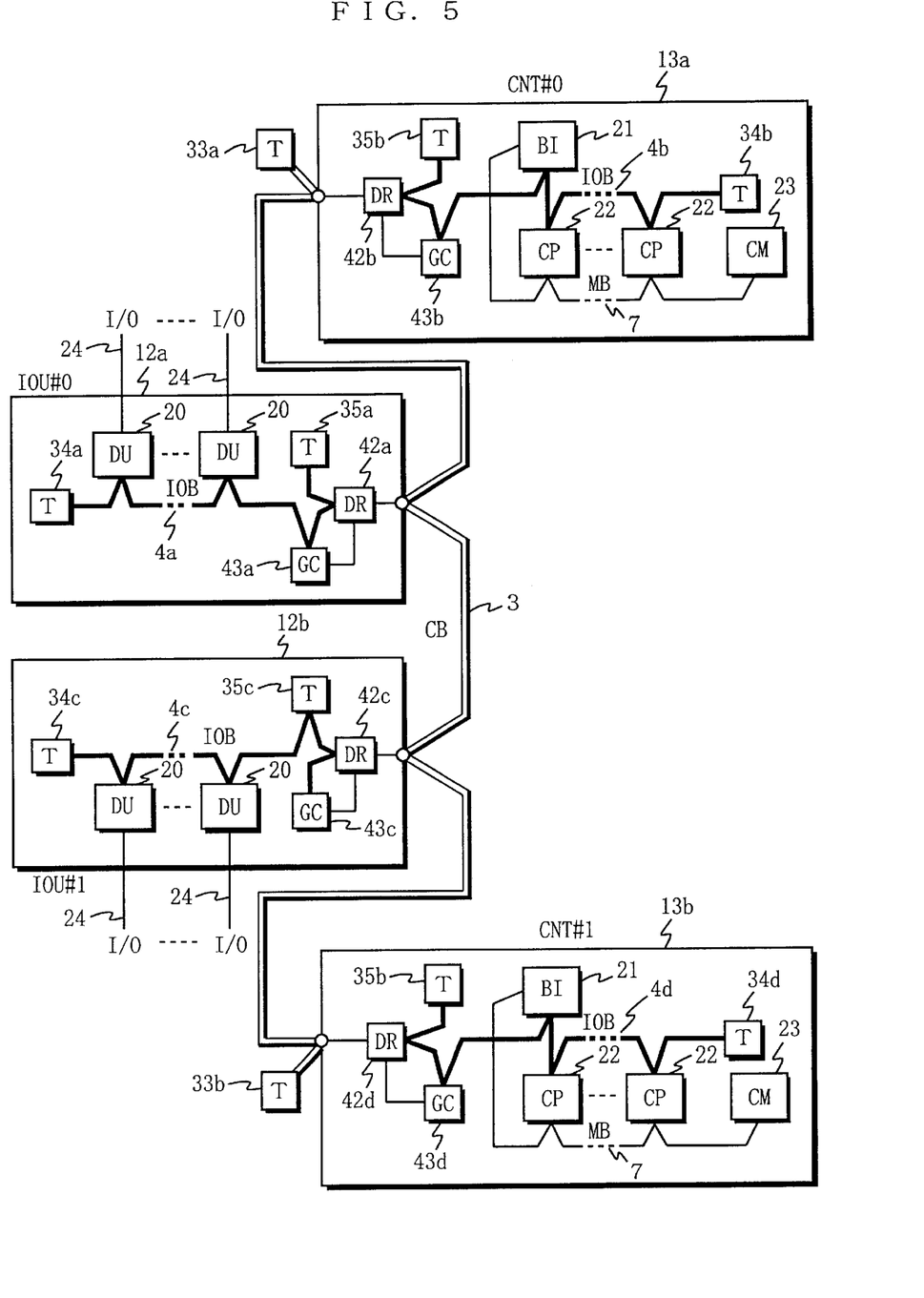
FIG. 5 is a block diagram showing the structure of a communication control data processing system according to a second embodiment of the present invention.
Figure 6:
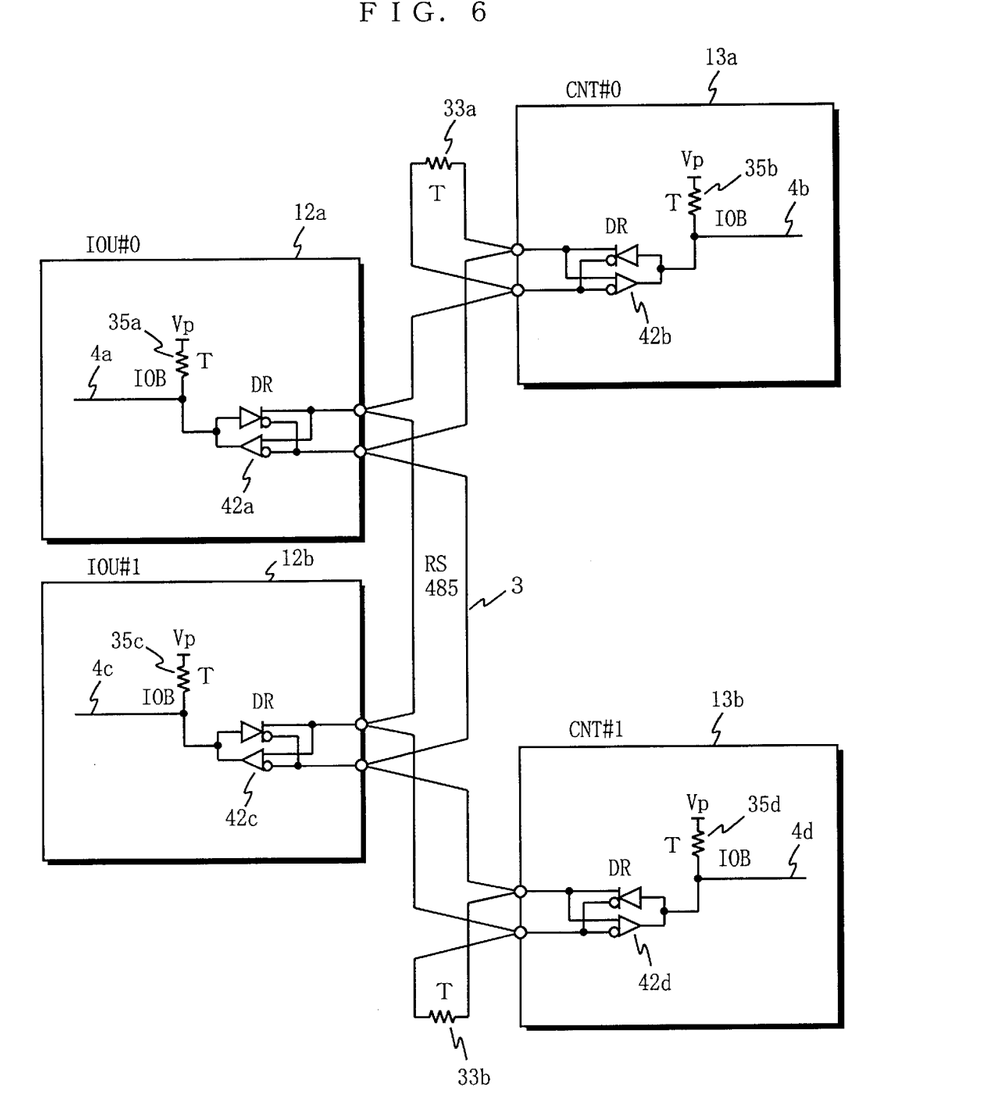
FIG. 6 is a diagram showing a common bus interface of the communication control data processing system according to the second embodiment of the present invention.
Figure 7:
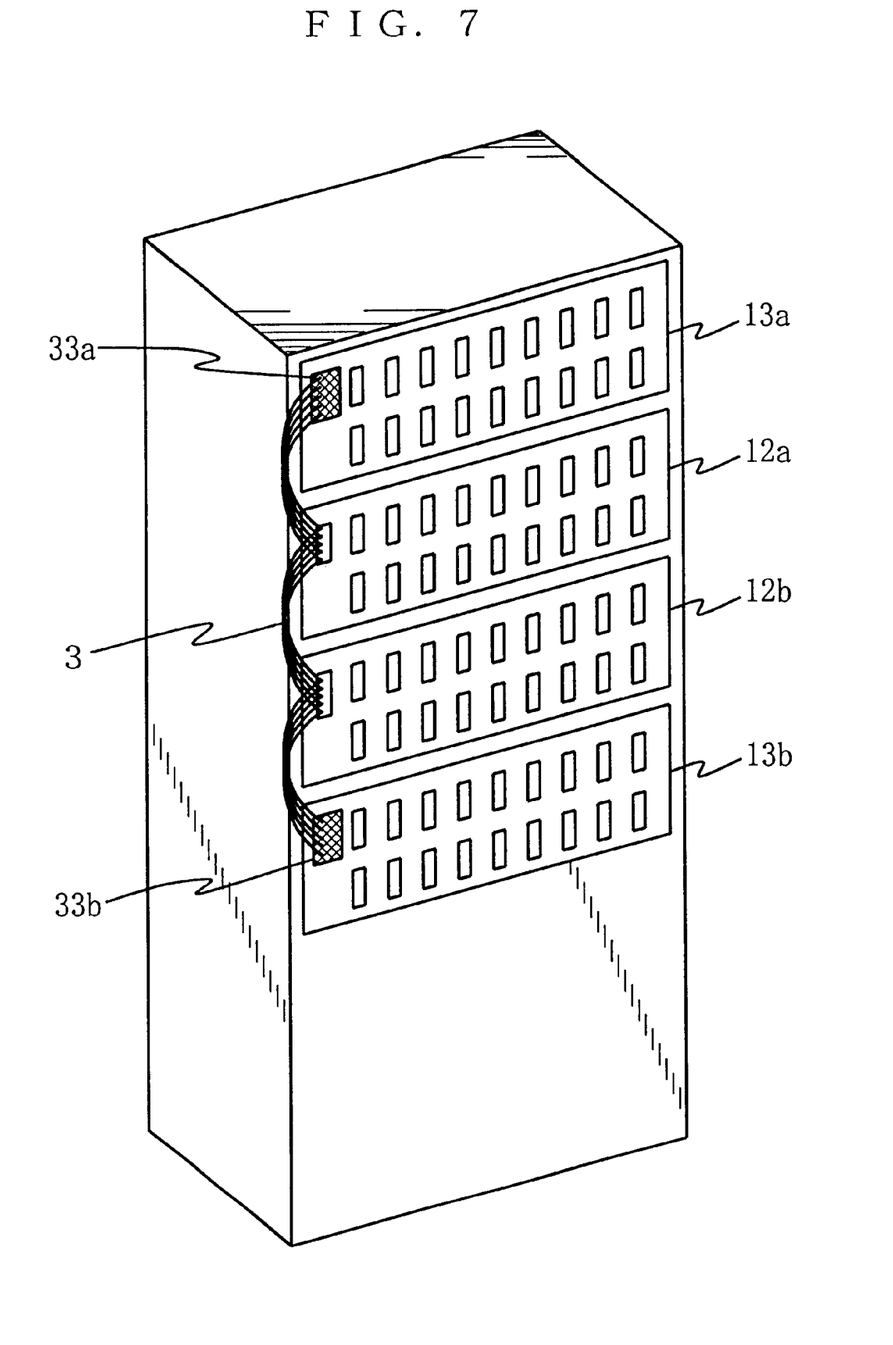
FIG. 7 is an exemplary cable connection between units on the back of the communication control data processing system according to the second embodiment of the present invention.

Referring to FIGS. 5 to 7, described is a data processing system according to a second embodiment of the present invention. In the data processing system according to the second embodiment, the common bus is implemented in a different form from that of the first embodiment. In the second embodiment, the same reference numbers as in the first embodiment are provided for the same components, and their description is omitted.

FIG. 5 is a block diagram showing the data processing system according to the second embodiment of the present invention. The data processing system in FIG. 5 includes dual-redundant I/O units 12a and 12b and dual-redundant control units 13a and 13b. The I/O unit 12b and the control unit 13b are auxiliary units to improve fault tolerance having the same structure as the I/O unit 12a and the control unit 13a, respectively.

The function cards in each unit are connected to I/O buses 4a to 4d. The I/O cards 20 in the I/O unit 12a are daisy-chained to the I/O bus 4a. Both ends of the I/O bus 4a are placed in the I/O unit 12a, one terminated with a resistor 34a and the other with a resistor 35a. The other I/O buses 4b to 4d have the same structure.

The units are daisy-chained to a common bus 3 of a single cable. The common bus 3 has characteristics to support hot-swapping with one end terminated with a resistor 33a, and with the other terminated with a resistor 33b. Therefore, a faulty unit can be hot-swapped for active maintenance during the operation of the data processing system. Furthermore, when the faulty unit is isolated, the ends of the common bus 3 are terminated with the resistors 33a and 33b, thereby allowing reliable data transmission between the function cards.

To connect the common bus 3 and the I/O buses 4a to 4d, each I/O unit includes a resistor (35a to 35d), a driver/receiver (42a to 42d), and a gate controller (43a to 43d). These components operate in the same manner as the resistors 32a to 32d, the driver/receivers 40a to 40d, and the gate controllers 41a to 41d in the first embodiment.

FIG. 6 is a detailed diagram showing an interface of one signal via the common bus 3 of the data processing system according to the second embodiment. Note that interfaces of other signals via the common bus are the same as the interface in FIG. 6. RS485 is used for the common bus 3, thereby allowing extension of the cable. An interface of an unbalanced (single-ended) transmission line such as TTL is used for the I/O buses 4a to 4d, thereby allowing easy construction of high-speed buses despite the bus length being restricted to be short.

FIG. 7 is a cable connection between the units on the back of the data processing system according to the second embodiment. The data processing system in FIG. 7 includes the dual-redundant I/O units 12a and 12b, and the dual-redundant control units 13a and 13b. The units are connected to the common bus 3 with one end terminated with the resistor 33a and the other with the resistor 33b. RS485 is used for the common bus 3, thereby allowing extension of a cable connecting between the units up to the distance defined by RS485.

In the second embodiment, RS485 is used for the common bus 3, and an interface of an unbalanced transmission line such as TTL is used for the I/O buses 4a to 4d. Alternatively, the individual buses may be different in specification. For example, the I/O bus 4a in the I/O unit and the I/O bus in the control unit may be different in specification.

Third Embodiment

Figure 8:
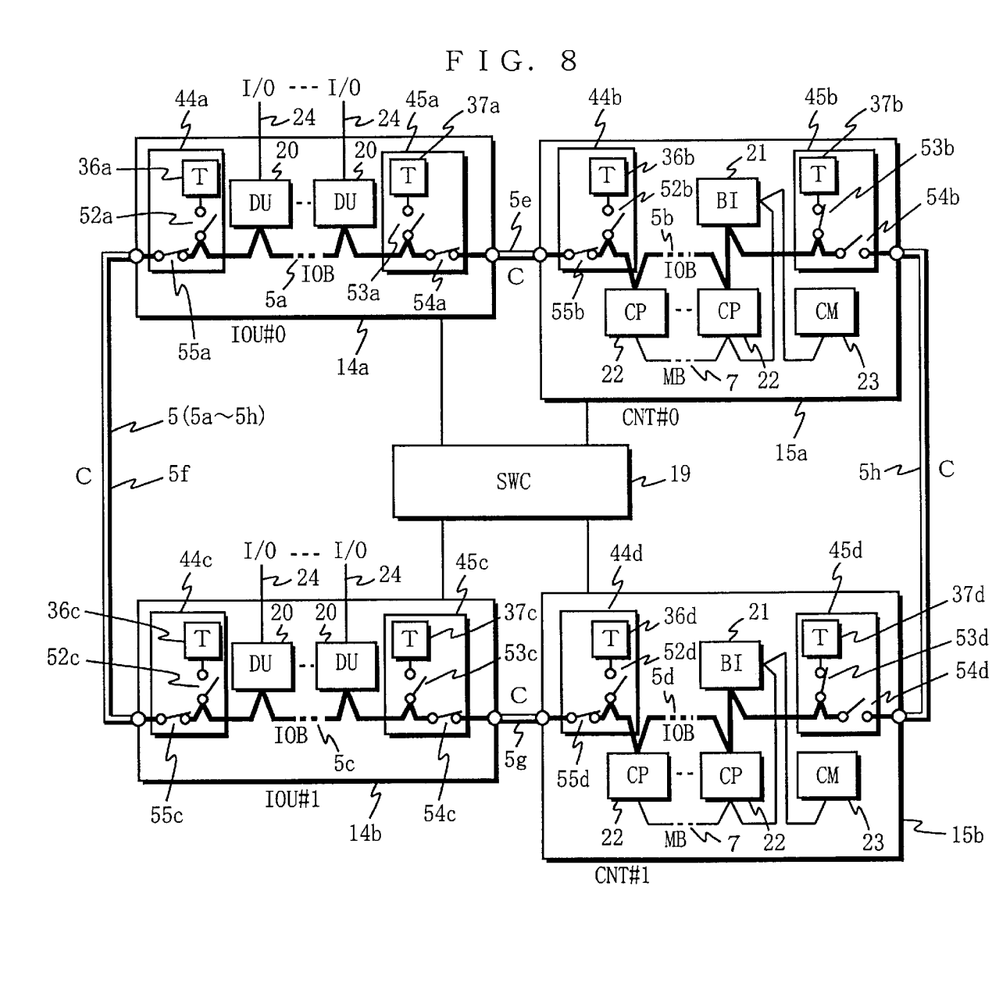
FIG. 8 is a block diagram showing the structure of a communication control data processing system according to a third embodiment of the present invention.
Figure 9:
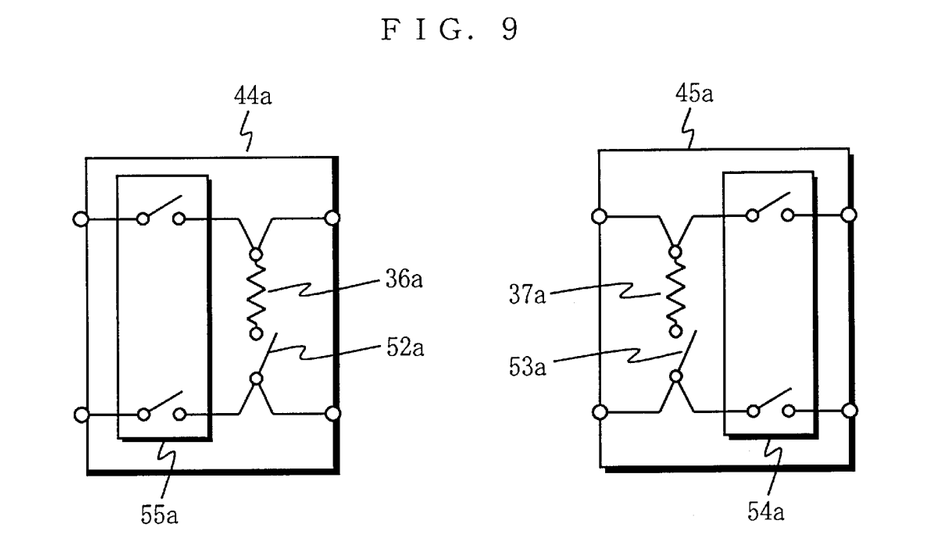
FIG. 9 is a diagram showing in detail the switching parts of the communication control data processing system according to the third embodiment of the present invention.

Referring to FIGS. 8 and 9, described is a data processing system according to a third embodiment of the present invention. The data processing system according to the third embodiment constructs a bus by connecting internal wiring in units with a switch, thereby allowing hot-swapping by the unit. In the third embodiment, the same reference numbers as in the first embodiment are provided for the same components and their description is omitted.

FIG. 8 is a block diagram of the data processing system according to the third embodiment of the present invention. The data processing system in FIG. 8 includes dual-redundant I/O units 14a and 14b, dual-redundant control units 15a and 15b, and a monitoring controller 19. The I/O unit 14b and the control unit 15b are auxiliary units to improve fault tolerance having the same structure as the I/O unit 14a and the control unit 15a, respectively. Each unit includes a plurality of function cards which can be hot-swapped, according to the type of unit.

The function cards in each unit are daisy-chained to internal wiring 5a to 5d. One end of the internal wiring 5a to 5d is terminated with switching parts 44a to 44d, respectively, while the other is terminated with switching parts 45a to 45d, respectively. Together with these switching parts 44a to 44d and 45a to 45d, the internal wiring 5a to 5d and four cables 5e to 5h for connecting the units form a loop-shaped I/O bus 5. For the I/O bus 5, a bus having characteristics to support hot-swapping, such as RS485 of an interface of a balanced transmission line, is used.

The I/O unit 14a includes two switching parts 44a and 45a. FIG. 9 is a diagram showing the switching parts 44a and 45a in detail. The switching part 44a includes a resistor 36a, a resistor connection switch 52a, and an I/O bus connection switch 55a. The switching part 45a includes a resistor 37a, a resistor connection switch 53a, and an I/O bus connection switch 54a. The switching parts 44b to 44d have the same structure as the switching part 44a, while the switching parts 45b to 45d have the same structure as the switching part 45a. For each switch, a semiconductor switch device, such as a relay or the like, is used.

The monitoring controller 19 controls the I/O bus connection switches 54a to 54d and 55a to 55d to disconnect the loop-shaped I/O bus 5 at least at one point. A bus obtained after disconnecting the loop-shaped I/O bus 5 is hereinafter referred to as a common bus. Furthermore, the monitoring controller 19 controls the resistor connection switches 52a to 52d and 53a to 53d to connect each end of the common bus to the resistor.

For example, when all units are implemented and no fault occurs, the monitoring controller 19 sets the switch 54b and/or 54d OFF, and sets the other I/O bus connection switches ON. In addition, the monitoring controller 19 sets the switches 53b and 53d ON, and sets the other resistor connection switches OFF. With this control over the switching parts 44a to 44d and 45a to 45d, the loop-shaped I/O bus 5 is disconnected between the control units 15a and 15b, thereby resulting in a line-shaped common bus. All function cards are daisy-chained to the common bus, and one end of the common bus is terminated with the resistor 37b while the other is terminated with the resistor 37d.

To isolate a faulty unit, the monitoring controller 19 controls the switching parts 44a to 44d and 45a to 45d so as to disconnect the loop-shaped I/O bus 5 at the position of the faulty unit and terminate both ends of the line-shaped common bus obtained by disconnection with the resistors. For example, when a fault occurs in the control unit 15a, the monitoring controller 19 sets the switches 54a, 54d, 55b and 54b OFF, and sets the other I/O bus connection switches ON. In addition, the monitoring controller 19 sets the switches 53a and 53d ON, and sets the other resistor connection switches OFF. With this control over the switching parts 44a to 44d and 45a to 45d, the loop-shaped I/O bus is disconnected at the position of the control unit 15a, resulting in a line-shaped common bus. All function cards included in the I/O units 14a and 14b and the control unit 15b are daisy-chained to the common bus, and one end of the common bus is terminated with the resistor 37a, while the other is terminated with the resistor 37d.

As described above, the data processing system according to the third embodiment comprises a plurality of units each including a plurality of function cards, cables for connecting the units, switching parts, and a monitoring controller. Together with the switching parts, the internal wiring in the unit and the cables form a loop-shaped bus. The monitoring controller controls the switching parts according to the implementation state of the units or their fault condition, disconnecting the loop-shaped bus to form a line-shaped bus and terminating both ends of the line-shaped bus with resistors. The data processing system as structured above allows quick hot-swapping of a faulty unit for active maintenance without the need for bus reconnection. Further, through the use of an interface of the balanced transmission line for the common bus, reliable data transmission can be achieved between the function cards.

Specifically, the data processing system comprises an I/O unit including an I/O card for transmitting and receiving communication control data through an I/O line, and a control unit for processing the communication control data with a processor card included therein by referring to information stored in a shared memory card. This structure allows quick hot-swapping of a faulty unit for active maintenance without the need for bus reconnection.

According to the third embodiment, RS485 of the balanced transmission line is used for the internal wiring 5a to 5d and the cables 5e to 5h which form the I/O bus 5. Alternatively, the buses forming the I/O bus 5 may be different from each other in specification. This I/O bus can be easily realized by modifying the third embodiment so that the connection point of two buses with different specifications is provided with drivers, receivers, and resistors for each bus.

Further, in the third embodiment, each unit includes two switching parts. Alternatively, the switching parts 44a to 44d and 45a to 45d, and the monitoring controller 19 may be implemented in a single unit.

The data processing system described in the first to third embodiments includes dual-redundant I/O units and control units, one is in operation and the other is on standby. Alternatively, however, the data processing system may include other unit structures. Furthermore, the data processing system may be structured such that both dual-redundant units may operate during normal operation, and only one of the units is operated when a fault occurs. The present invention may be applied to a general data processing system with the above mentioned structure, having the same effects.

In the first to third embodiments, each unit in the data processing system includes function cards with integrated circuits incorporated on their printed circuit boards as function elements. Each unit may include, however, other function elements including drive units such as hard disks and cards such as PC cards, for example. Furthermore, in the above embodiments, both ends of each bus are terminated with pull-up-type resistors as terminators. Alternatively, the terminators may be terminating circuits such as Thevenin-type terminators or active terminators using non-linear elements.

Further, in the above embodiments, RS485 is used as the balanced transmission interface. Instead, another high-speed transmission interface such as SCI-LVDS defined by IEEE 1596.3 or LVDS (Low Voltage Differential Signaling) defined by ANSI/TIA/EIA-644 (RS-644) may be used. Moreover, although structured by multi-line using RS485 in the above embodiments, the buses can be structured by less signal lines in number or a single line, while being capable of transmitting the same amount of data, by using the high-speed transmission interface such as LVDS described above. Therefore, the buses of the present invention can be structured not only in multi-line but also in a serial line according to the applied transmission system.

While the invention has been described in detail, the foregoing description is in all aspects illustative and not restrictive. It is understood that numerous other modifications and variations can be devised without departing from the scope of the invention.

What is claimed is:

1. A data processing system in a unit structure comprising:
 a plurality of units each having one or more function elements and an individual bus for connecting said function elements, said individual bus of each unit daisy-chaining said function elements in said each unit, each individual bus being terminated with terminators at both ends of said each individual bus, and said each individual bus supporting hot-swapping;

a common bus daisy-chaining each of said units, said common bus being terminated with terminators at both ends of said common bus, and said common bus supporting hot-swapping;

bus relay means for relaying data between said common bus and said individual bus, said bus relay means including individual bus receivers operable to receive data from said individual buses, respectively, common bus drivers operable to transmit the data received by said individual buses, respectively, common bus receivers operable to receive data from said common bus, and individual bus drivers operable to transmit the data received by said common bus receivers to said individual buses, respectively;

wherein one or more of said units are I/O units, said I/O units each having a plurality of I/O cards operable to transmit and receive communication control data through a respective I/O line, wherein one or more of said units are control units, said control units each having a shared memory card and a plurality of processor cards operable to process said communication control data responsive to information stored in said shared memory card, and wherein one of said plurality of units includes a bus arbitrating part for polling each of said function elements, said bus relay means drives only said common bus drivers corresponding to said unit which includes said bus arbitrating part during the polling by said arbitration part responsive to signals required for polling in said common bus, and said bus relay means drives only said common bus drivers corresponding to said unit which includes said function element responding to the polling during the polling by said arbitration part responsive to signals required for polling in said common bus.

* * * * *